3,168,796
INOCULATION OF LEGUMES

James R. Scott and Harley R. Bumgarner, Columbus, Ohio, assignors to Agricultural Laboratories, Inc., Columbus, Ohio, a corporation of Ohio
No Drawing. Filed Mar. 19, 1962, Ser. No. 180,827
12 Claims. (Cl. 47—1)

This application is a continuation-in-part of our application Serial No. 15,272, filed March 16, 1960, which now is abandoned.

This invention relates to the art of inoculating seeds, particularly to storable pre-inoculated seeds as a product of commerce, and to other products and processes useful in the inoculant art.

Enrichment of soil by the replenishment of organic nitrogenous compounds is conveniently accomplished by periodically growing a crop of leguminous plants in symbiotic relationship with bacteria of the genus Rhizobium. These bacteria are known to infect the roots of legumes and cause a desired nodule formation wherein conversion of nitrogen from the air into organic nitrogenous compounds is believed to occur.

Generally, nitrogen fixation occurs in an amount proportional to the extent of effective nodule formation. Maximum effective nodule formation (from the standpoint of nitrogen fixation) on the roots of a legume plant depends upon selection of the proper species of Rhizobium bacteria for infection of the particular legume under consideration. For example, a bacteria of one species of Rhizobium may show a preference for effectively infecting legumes such as soybeans, but relatively little ability to effectively infect other legumes. Still another species of Rhizobium may effectively infect trefoil, but not alfalfa to the same degree.

In general, the species of Rhizobium particularly effective to inoculate a legume, and the particular legume or group of legumes known to be greatly infected by that species of baceteria, are referred to as a cross-inoculation group. While these groups may be subject to variation depending upon possible mutative effects, or possible culture variations, it is widely recognized at present that, for example, Rhizobium of the species *japonicum* is used with soybeans to give maximum symbiotic nitrogen fixation; *R. trifolii* with clovers; *R. meliloti* with alfalfa and sweetclovers; *R. leguminosarum* with peas and vetches; *R. phaseoli* with beans of the garden variety; *R. lupini* with lupines; etc. However, it is not always critical that only one species of bacteria be employed with a particular legume, since mixtures of species of Rhizobium may frequently be used, as is generally understood in the art.

Manufacturers of legum inoculant compositions in the United States have heretofore conventionally relied upon techniques designed to maintain the Rhizobium bacteria of an inoculant composition in an active living state. An illustrative past practice along this line has been to mix a moist culture of bacteria, in the form of a heavy suspension of the bacteria, with a pulverulent carrier such as humus, peat or the like. The carrier maintains the bacteria in a moist state, and at the same time, gives the total mass a powdery character such as desired for mixing with seeds. From an appearance and handling standpoint, such a mixture appears to be dry; but the mixture actually has a relatively high water or moisture content. In fact, it is critical that at least about 30% up to about 45% by weight of the mixture is water, inasmuch as the bacteria die off rapidly if the moisture content drops significantly below 30%, say down to 20% or lower (the numbers of bacteria dying being dependent on the age and vigor of individual organisms, the nutrient supply, the temperature, the environmental gas conditions in a package, etc.). The bacteria are to be characterized as living vital organisms in this mixture, even though they may appear to be relatively inactive on superficial examination. They reproduce, albeit slowly, in packages of the mixture. For a time, they tolerate the environment of reduced moisture level with the carrier, even though higher moisture levels and ample nutrient constitute a preferred environment for reproduction.

As might be expected, however, after a period of time, e.g., a few months or possibly longer depending upon storage conditions, the blend of packaged bacteria and carrier becomes worthless for use as an inoculant for legume seeds, since the bacteria die for various reasons (e.g., the relative shortage of food and moisture in their environment as compared to what they ideally need in view of their nondormant active living state).

Thus, a merchant handling packages of such prior art active and alive bacterial inoculants is confronted with a serious problem. Both he and the supplier of such inoculants must constantly be vigilant to refrain from accidentally supplying a farmer with a batch of inoculant which has become ineffective. Such vigilance is costly; and a more truly stable inoculant powder which remains potent even after relatively lengthy storage is, and has been for a long time, much to be desired.

Additionally, the ultimate user of these prior art inoculants is himself confronted with a serious problem. He must plant his seeds very shortly after inoculating them, since the inoculant, once applied to seeds, is exposed to ordinary atmospheric conditions and, relatively speaking, tends to drop in moisture content significantly. It is believed that the drop in the moisture level of the moist carrier causes death of the bacteria due to desiccation, although other factors may also contribute to cause that result.

Of note also is the fact that moisture is frequently added to these prior art inoculants at the time of mixing with seeds in order to cause the inoculant powder to stick to the seed pellicles. Because of this, the resulting treated seeds, if carelessly handled and too much moisture is added, tend to rot or suffer loss in germination due to damaged seed coats.

Since filing our original patent application, Porter et al. U.S. Patent No. 2,932,128 has been issued, wherein it is suggested that problems such as noted above may be obviated by a method of inoculation involving placing non-dormant moisture-laden bacteria beneath scarified seed coats. But such procedure, similarly to the prior art practice noted above, relies upon the use of non-dormant moisture-containing bacteria.

Still another inoculant teaching of more recent vintage is that of Burton U.S. Patent No. 2,995,867, wherein it is suggested that non-dormant moisture-containing bacteria, with other ingredients, should be embedded in seed coatings of synthetic gum such as methylcellulose, and the treated seeds promptly planted. As in the case of the prior art noted above, non-dormant moisture-containing bacteria are also relied upon in this Burton patent teaching.

While non-dormant moisture-containing bacteria have received much attention in the art of inoculating legumes, it should be recognized that the use of dormant bacteria in such applications is not unknown. For example, an inoculation practice of foreign origin involves the use of dormant Rhizobium bacteria sealed in glass vials. Users of the product are instructed to mix the contents with water, sprinkle the resultant mixture over seeds, and then plant the treated seeds as soon as possible after inoculation. Thus, while dormant Rhizobium bacteria have heretofore been supplied in commerce in foreign countries (Australia in particular), the dormant nature of the bacteria has been intentionally sacrificed when water has been added during the step of application to seeds.

Although foreign practice of the aforenoted type is of relatively recent vintage, the steps of rendering of Rhizobium bacteria dormant, even by a freeze-dry process sometimes referred to as a lyophilization, was accomplished long ago. It is understood that L. A. Rogers of the United States Department of Agriculture was successful in doing this as early as 1914. In addition, M. D. Appleman and O. H. Sears, in Soil Science Society Proceedings of 1944, pp. 98–100, reported on their laboratory efforts using pellets of lyophiled Rhizobium mixed with unspecified amounts of aluminum hydroxide, talc, or calcium carbonate and then applied in an unspecified quantity to seeds. But their laboratory efforts left much to be desired, and have remained nothing more than a laboratory curiosity, since, insofar as is known, all practical commercial practice in the inoculant art, prior to our invention, has involved application of non-dormant moisture-containing bacteria to legume seeds.

This invention shuns the prior art practice of using moisture laden bacteria for seed inoculation, and advantageously, provides the art with a commercially practicable inoculant composition of special substantially moisture-free dormant character, which, as a specially-packaged product of commerce, may be shipped about and then used for inoculation of legume seeds without the addition of any moisture, thereby avoiding possible deleterious effects of moisture on the germination of seeds as well as avoiding sacrifice of the dormant character of the inoculant composition as it exists on the inoculated seeds. Our packaged composition remains effective even after storage for lengthy periods, e.g., at least through a pre-planting and planting season totalling several months (as is required for a reliable commercially-practicable storable inoculant preparation), and upwards to a year or even 2 or 3 years or longer. The bacteria in this new inoculant composition are dormant (i.e., inactive and quiescent), not exhibiting the usual life function of general reproduction, but are revitalizable to a full-life virile condition involving reproductive activity (effective for inoculation purposes) upon being planted in moist ground with seeds. In this composition, they are in a dry finely-divided state in intimate association with a finely-divided carrier or intermediate. Preferred powdery carriers or intermediates have particularly pronounced properties in relation to the bacteria as well as to seeds to which the bacteria are to be added for treatment.

Further, the inoculant powder may contain special additives, such as, for example, sugars (which provide an immediate food supply for bacteria on their revitalization and which also give some evidence of serving a protective function for the bacteria), small amounts of trace elements (needed by plants for growth), etc. By promoting plant growth, trace elements in the composition serve in combination with other ingredients of the inoculant to improve the total process for gaining increased symbiotic nitrogen fixation.

Even though our entire packaged inoculant mixture itself is dry (i.e., substantially free of moisture or containing only small amounts of free moisture on the order of ½% by weight up to about 5% by weight, but not amounts on the order of about 8–12% by weight), it can be mixed with seeds in the dry state to give a mass of seeds having the inoculant powder adhered to the outer surface of the pellicle of the seeds. No water need be added to cause adherence of the dry dormant inoculant to the surface of the seeds. The bacteria of the inoculant are thus placed in adherent relation to the seeds, but are advantageously removed from the germ of the seeds by the pellicle barrier or seed coat barrier enclosing the germ tissue of the seed. No possible chance stimulation of the dormant bacteria to life by contact with a seed's nutrient germ tissue is thus occasioned. Seeds thus inoculated can be stored for lengthy periods prior to planting, e.g., many months and upwards of to a year or two years or so under those storage conditions as properly maintained in seed warehouses. Thus a major advantage of the present invention is that seeds may now be pre-inoculated by a processor and then shipped and sold to jobbers, dealers, etc., and ultimately to farmers, and still remain effectively inoculated, as may be demonstrated by subsequent planting even after a period of storage amounting to many months or even years.

An entirely new inoculated seed product of commerce is thus presented the art by this invention. Significantly the invention obviates the requirement that planters either invest in equipment for inoculating seeds just preliminary to planting or hire others specially to perform the task shortly before planting.

Many other advantages and benefits of the present invention will be evident as this description proceeds. Of note is the fact that inoculated seeds of the invention are not tacky or prone to clump; therefore, they advantageously flow readily in planting equipment such as drills. A major objection of the farmer to prior art types of inoculated seeds is thus removed.

It is emphasized that the packaged inoculant powder hereof is a blend of dry dormant bacteria in a finely divided or powdery condition in intimate association with a dry carrier also in a finely divided or powdery condition. The dormant bacteria in this inoculant powder are substantially moisture free, containing only fractional amounts of water on the order of ½% by weight or so up to about 2 or 3% by weight, or possibly about 5% by weight. They do not contain sufficient amounts of moisture to be generally and universally stimulated back to life functions such as reproduction; and they are not exposed to any significant quantity of materials designed to give up moisture to them in the package. They are in intimate blended relationship with the powdery carrier, so much so that they are appropriately characterized as clinging to the dust carrier particles. Additionally, the carrier performs an essential function in promoting adherence between dry seeds and the dry bacteria of the inoculant, without detracting in any significant way from the revitalization of the bacteria to an active virile life upon their coming into contact with moisture and food or nutrient, as occurs upon planting an inoculated seed in most soils.

The description of the invention is made without the aid of a drawing since a drawing cannot accurately depict the essential relationships, requirements and characteristics of the invention. The powdery inoculant material is a blend of finely divided material; thus not lending itself to illustration by drawing. The pre-inoculated seeds have the appearance of seeds which have a layer of dust upon them, a concept which is readily visualized by a mental picture, needing no sketch or drawing from comprehension. Indeed, depicting of exact relationships between seeds and particles of materials in the inoculant dusted upon them would be more misleading in a drawing than of benefit in understanding the invention. Illustration of the growth of nodules on the roots of inoculated plants would serve no useful purpose as it is now well known. Any graphic illustration of the processes of the invention needed for comprehension is supplied by the description and itemization of process steps in the detailed disclosure to follow. For convenience these steps are set forth briefly as an introduction to the detailed disclosure, and are as follows:

(1) Rhizobium bacteria of selected species are grown in a nutrient medium.

(2) The bacteria are converted to a dry dormant state, remaining alive but not evidencing the normal functions of life such as reproduction.

(3) The dry dormant bacteria are blended with a carrier powder as described to form the stable and storable inoculant.

(4) The powdery inoculant composition is enclosed in a hermetically-sealed envelope or container of moisture-barrier packaging material whenever shipment and/or storage is visualized.

(5) The powdery inoculant is mixed with seeds to produce an adherent "dust" coating on the seeds.

(6) The inoculated seeds may be planted immediately, or shipped and stored using ordinary seed handling techniques. Even after storage of the inoculated seeds for many months or even years, subsequent planting of the seeds in most moist soils stimulates the dormant bacteria on the seeds to active life; and the symbiotic relationship between the legumes and bacteria promotes nodule formation and nitrogen fixation.

The manner of growing Rhizobium bacteria for practicing the invention may be accomplished using standard procedures well known in the art. As an illustration, Rhizobium japonicum are injected by means of a sterile hypodermic syringe or the like into a previously sterilized tank containing sterile nutrient media and water. The temperature is maintained at a suitable level for growth, e.g., around 80–85° F. being an optimum range for rapid reproduction. The sterile media and water mixture suitably consists of, by weight, about 1% sucrose (or other suitable carbohydrate nutrient as a carbon source), about 2% of a mixture of about equal parts of potassium phosphate (both mono- and di-potassium phosphate), calcium carbonate, calcium nitrate (with or without said calcium nitrate), and yeast extract, and about 97% sterilized tap water containing trace amounts of magnesium, iron, boron, molybdenum, etc. Since the bacteria are aerobic, the mixture in the tanks should be aerated by passing a small amount of oxygen therethrough, bubbling of air through the mixture being suitable. After several days, i.e., 5 to 7 days, a thick suspension of bacteria in the tank results. While the foregoing method of growing a culture is preferred, it should be understood that any suitable method may be used.

Next the bacterial suspension is subjected to a series of treatments to convert the bacteria into a substantially moisture-free state without killing them. Sublimation of the water from the aerobic Rhizobium has been discovered to be entirely effective, but must be accomplished with care in order to avoid killing the Rhizobium. As a preliminary step the thick suspension of bacteria may be washed so as to free the living cells or organisms of bacteria from nutrients and by-products of growth, such as certain polysaccharide-type materials and gums. It will be appreciated that successful conversion of the bacteria to a dormant state can be accomplished without washing away by-products of growth, but the resulting dormant bacteria, if originally grown in nutrient agar, may contain undesirably large amounts of gum content, even sufficient to interfere with effectiveness of the bacteria in inoculant use. But moderate gum content has not been found objectionable, and may even serve a beneficial protective function.

Washing of the Rhizobium to remove by-product, when done, is suitably accomplished by adding water, preferably a saline solution buffered with potassium phosphate to a pH of 7, to the suspension of bacteria and then centrifuging the mass. The bacteria tend to separate toward the outer walls of the centrifuge leaving behind the by-products of growth in solution in the water. Most of the waste water is drained from the organisms during centrifuging, but some of course remains in the mass of organisms in the centrifuge. The important point to recognize is that the bacteria are still in a water environment at this stage, although they are highly concentrated. The process of separation may be conducted, if desired, in a Sharples continuous flow centrifuge with the waste water continuously withdrawn. If desired, the bacteria may be subjected to two or three washing steps, followed by removal of most of the wash water.

Preferably, either in the last wash water, or as a separate step if washing is not done, a small quantity of nutrient material (e.g., mono- or di-saccharides such as sucrose, glucose, etc.) is added to the active bacteria at this stage. Quantities of nutrient material sufficient to approximately equal the weight of the bacteria in the dormant state, or even larger quantities, may be used. However, it is desirable to add, at this stage, only a sufficient quantity of such nutrient material to match about 10% of the weight of the moisture-containing non-dormant bacteria. The added nutrient remains with the bacteria even after treatment converting them to the dormant state, and is immediately available for their continued growth and reproduction at any subsequent time the dormant cells are placed in contact with moisture. It may also serve a protective function for the bacterial cells during conversion to the dormant state as well as while they are in that state.

Moisture-containing bacteria, preferably with a nutrient added as noted above, are then ready for treatment to convert them into a dormant state by any suitable process. Preliminarily, of course, they will be centrifuged to remove excess free water if they are not in a rather thick moist mass. Conversion to the dormant state is suitably accomplished by a freeze-dry process which first generally involves freezing the bacteria, usually in a relatively rapid manner by exposing them to sub-zero temperatures. Since the bacterial cells themselves normally contain about 75–95% water as part of their make-up, they may properly be referred to as "frozen." A suitable technique for freezing the cells is to immerse a vessel containing the moist washed bacteria in a bath of acetone and Dry Ice having a temperature on the order of $-35°$ C. (or $-70°$ C.). But other means to freeze the cells may be used so long as the freezing operation is conducted rapidly enough to prevent rupture of the cell walls and killing of the bacteria by the growth of excessively large ice crystals. Since sublimation of water from the frozen mass of bacteria must be accomplished, it is desirable to spin or rotate the vessel containing the moist bacteria as it is submerged in the freezing bath so that a thin layer or shell of frozen bacteria and water forms on the walls of the vessel; but this is not critically necessary in the illustrated process. Even so, small crystals of ice are more conveniently and rapidly sublimed from a thin layer or shell than a large chunk, and the hazard of incomplete sublimation of frozen water from a thick mass is avoided.

In accomplishing sublimation of frozen water from frozen water-containing bacteria, a vacuum is drawn over the frozen bacteria while maintaining the bacteria in a frozen condition. Suitably a vacuum is drawn until gas pressures as low as 0.1 micron or 0.0001 mm. of Hg are reached, although it is not absolutely essential that such a high state of vacuum be employed. In the freeze-dry process of conversion, the important requirement is that the frozen water be sublimed from the frozen or cold bacteria, i.e., removed from the bacteria by passing essentially directly from the frozen to the gaseous state (without melting). The vacuum is preferably maintained until the frozen water has sublimed to the extent that only about one percent water, more or less, remains in the bacteria. Termination of sublimation under vacuum, of course, may occur earlier when the water content is somewhat higher (e.g., 3%) but still drastically reduced, as required to convert the bacteria to a dormant state. However, such an expedient to reduce costs gives inferior results, and is preferably avoided. Sublimation, as described, permits the removal of water from the cells of frozen bacteria without killing the bacteria, particularly when conducted carefully and rather rapidly, as described. If desired, vacuum conditions of higher pressure but still reduced pressure, as well as some artificial heat such as mild infra-red, may be used so long as rapid sublimation of the frozen water occurs, as required.

It is significant to note that the subjection of cells of bacteria to a vacuum under normal room temperature conditions causes their death by degassification, whereas the technique described leaves them in a dormant state ready to be revitalized at a later date.

After sublimation of the water from the cells of bacteria, they may be brought back to room temperature and stored in a substantially moisture-impermeable container at room temperature or even somewhat higher or lower temperatures such as may be encountered in normal transit about the country. Freezing temperatures do not seem to harm them; but they should not be subjected to highly elevated temperatures such as sterilization temperatures, as will be evident to anyone skilled in the art. In fact, temperatures above room temperature (e.g., 70° F. or possibly 75° F.) should generally be avoided where maximum length of storage of the specially packaged inoculant composition is contemplated (although temperatures up to about 90° F. or so for brief periods may not be harmful).

The dried bacteria resulting from sublimation are in the form of a cake which may be considered to be easily crumbled into a powder by tumbling or by shaking, provided the tumbling or shaking is very patiently pursued. Usually more vigorous grinding action is necessary in production. It is essential, in our pre-inoculant product, that dormant bacteria be broken down into finely divided particles consisting of either individual bacterial cells (e.g., about 1 to 3 microns) or small agglomerates of cells generally no larger than several microns (e.g., 10 microns or possibly 25 microns) in size, and at least smaller than about 40 or 50 microns in size. Preferably at least about 70% of the particles of bacteria are no larger than about 10 microns in size.

Noteworthy is the fact that dormant bacteria, in concentrated condition, are not alone particularly usable as an inoculant for dusting on legume seeds to form a pre-inoculated storable quantity of seeds having an adequate distribution of cells of bacteria adherent to the outer surface of individual seeds. In solving this problem, we have discovered a useful and specialized relationship between legume seeds, dormant Rhizobium bacteria, and a powdery intermediate or carrier. This relationship involves adherence or clinging between powdery dormant bacteria and a powdery intermediate, satisfactory to provide a dispersal of the bacteria and distribution thereof in substantially uniform concentration throughout the total inoculant powder. The resulting mixture is conveniently applied to the outer surface or seed-coat of seeds to gain adequate distribution of bacteria; and the mixture adheres as a dust coating on the surface of seeds even though no water is present such as heretofore employed in gaining adherence of bacterial inoculants to seeds.

Some effort has been made to explain the clinging of dormant bacteria to the powdery carrier particles as taught herein by a theory involving a relationship between static electrical charges. The bacteria carry a negative static charge under most conditions, and it is postulated that the finely-divided powdery intermediate carries a positive static charge under the particular conditions involved when mixed with the bacteria. Mixing the two together according to this invention involves thorough blending such that the finely-divided particles of both the bacteria and carrier are so intimately blended that possibly additional forces (e.g., surface phenomena) may to some extent also account for the clinging of the bacteria to the powdery carrier. Efforts to understand the clinging action have also involved us in the question of what part, if any, amphoteric properties for carriers may play. It is known that under some conditions certain powdery intermediates do exhibit negative charges. This last is particularly true in connection with the powdery intermediate kaolin, which is one of the outstanding intermediates to employ according to the invention. Whatever the fundamental explanation, be it by way of static charges or mechanical interlocking or adsorption, the dry finely-divided dormant bacteria, when mixed with a finely-divided powdery non-hydroscopic intermediate as discussed below, tend to cling to the intermediate particles, and the whole has been found to remain in satisfactory adherent relationship upon the exterior surface of the legume seeds.

An essential requirement of the intermediate or carrier is that it be finely divided. Powdered particles capable of passing a screen of 200 mesh may be useful, although particles smaller than 75 microns are greatly preferred. Powders of finely-divided character consist essentially of those having a diameter or size no greater than about 40 microns, preferably with 80% or more of the particles in the range of about 1 to 10 microns. These finely-divided powders have been found particularly and strikingly effective, especially in the case of intermediates or carriers such as clays (particularly kaolin), graphite, charcoal (particularly activated charcoal), etc. Some mechanical interlocking between powdered bacteria and the powdery intermediate apparently occurs, and the irregular jagged edges of the discrete powdery particles of the carrier or intermediate may contribute to a mechanical interlocking with the outer surface of legume seeds, particularly on microscopically irregular surface areas thereof, or such irregular surface areas thereof as, for example, the hilum area (although the entire surface of seeds is covered with a clinging dust coating of inoculant). In the case of alfalfa seeds, for example, it has been discovered that the major concentration of the carrier particles with associated bacterial cells occurs at the hilum area of the seeds, which is a small projection with associated crevices on the alfalfa seed surface, and is covered by, or has its associated crevices filled with, a plurality of hair-like protuberances. This irregular area of the external surface of alfalfa seeds provides a natural location of attachment for the dry, substantially moisture-free inoculant powder hereof, but other portions of the surface of alfalfa seeds are also covered discontinuously with a layer of the clinging inoculant dust.

In addition to the irregular (non-smooth) surface character of the particles of the carrier, it is also important that they be non-hygroscopic, particularly in cases where the inoculant consisting of dormant bacteria and carrier is to be used in coating legume seeds to form a pre-inoculated quantity of seeds suitable for storage in standard seed warehouses. Powdered irregularly-shaped starch materials or cellulosic materials such as Methocel satisfy this requirement for the carriers. However, in general, inorganic irregularly-shaped carrier particles are greatly preferred over organic particles, which latter generally are less free flowing than the inorganics. Nevertheless, specially treated (e.g., dehydrated or chemically modified) finely-divided organic materials may be so tailored as to give substantially equivalent results to those obtained when using kaolin, the preferred material for use in the carrier function.

While carriers of extremely high or low pH are undesired inasmuch as subsequent exposure of the mixture of dormant bacteria and carrier to moisture is contemplated at the time treated legume seeds are planted, it has surprisingly been discovered that a much wider range of pH for the carrier may be used to give satisfactory results according to the invention than taught, for example, in Erickson Patent No. 2,726,948, here incorporated by reference. For example, the pH of commercial kaolin is around 5, and yet this material has been found to give excellent results according to the invention. In the past, the pH of a Rhizobium-humus mixture has been carefully adjusted so as to lie within the range of about 6.0 to 7.5, a rather restricted range. In practicing the present invention, the pH range may vary from approximately 5 or so up to approximately 8 without untoward acid or alkaline attack of the bacteria at the time of moistening during planting. This may be explained in part by noting that the bacteria in the inoculant mixture of this invention are in a dormant, substantially moisture-free state, where pH becomes much less significant, and the quantity of a mildly acid or acidic carrier for the dormant bacteria is not sufficient to interfere with revitalization of the dormant bacteria into life functions at the time of planting in moist soil, where dissipation of much of the mildly alkaline or acidic character of the carrier occurs to surroundings at a rate depending on the moisture and pH of the soil.

The carrier should be non-toxic, lacking ability to inhibit effectively the further growth of the Rhizobium at a subsequent time when they are drawn out of their dormant state. Aluminum silicate complexes, talcum, montmorillonite, etc., are further illustrations of possible carriers of this type, montmorillonite being preferred over talcum because of its abilities as a material causing somewhat more pronounced "clinging" characteristics as aforenoted. In the usual case the carrier is inert in the sense that it does not react chemically with ingredients of the bacterial cells. However, some content of carbohydrate nutrient such as, for example, a mono or disaccharide, may be blended with the dormant bacteria; and while the usual saccharide is not effective as a carrier, its presence in the powdery inoculant composition indicates that the materials of the inoculant power other than the dormant Rhizobium need not all be chemically inert to the bacterial cells.

The preference of kaolin as a carrier has previously been alluded to. Characteristically kaolin is an oil absorptive material; and it is possible that this feature may play a part in the adherence that kaolin exhibits to seed coats (which may contain small amounts of seed oils). It is not felt that the water of hydration in kaolin is of major significance. Activated charcoal is also a desirable carrier, and is a material which does not have chemically combined water, sometimes called water of hydration, in its structure. Of course, the free water content (as distinguished from water of hydration) of a carrier should not be in excess of a few percent up to possibly about 5% or even sometimes 6%; thus carriers are appropriately termed dry or substantially moisture-free (referring to water not chemically combined).

Blending of the dormant bacteria (rendered finely-divided suitably by grinding in a high speed air grinder) with the powdery intermediate is accomplished using ordinary mixing procedures, the critical requirement being that water is excluded during the mixing step. Since an intimate blend of finely-divided particles is required, it is necessary to continue mixing until the particles of bacteria and carrier are finely divided and essentially uniformly distributed throughout the bulk of material being mixed. Suitably this may be rapidly accomplished from a practical commercial standpoint by using mixing apparatus such as a ribbon blender, but any suitable mixing apparatus for the bacteria and carrier, designed to provide an intimate blend of materials, may be employed.

As an illustration of a specific product formed according to the invention, dormant *R. japonicum* bacterial cells (some in clumps but all particles below 20 microns in size) are intimately blended in a mixer with commercial kaolin (having a particle size smaller than 200 mesh, with 85% of the particles lying in the range of about 1 to 3 microns in diameter), the ratio of bacteria to kaolin being approximately one part to 2000 parts by weight (i.e., about 12.5 milligrams of bacteria for every avoirdupois ounce of kaolin). Blending is easily accomplished by a high speed air grinder, and the product will be noted to consist of particles of kaolin on the irregular surfaces of which the bacterial cells adherently cling. While kaolin contains water of hydration, it is essentially free of uncombined water and the total mixture contains a free water content of not more than about 1 or 2%, or possibly 3%. Indications are that the total moisture content of the mixture should remain low for maximum storage life, but it may reach up to around 5% without revitalizing all the dormant bacteria back to active life functions (although some few may be revitalized at 5% moisture and then die off due to the adverse conditions for active life). Moisture contents upwards of 8–12% or so are to be carefully avoided during storage.

Another specific inoculant product was made by blending the ingredients of the foregoing specific product at a ratio of bacteria (with about 10% sucrose) to kaolin of approximately one to 300 by weight (i.e., about 95 milligrams of *R. japonicum* for each ounce of kaolin).

From the standpoint of adequate bacterial content plus adequate carrier for adherence to seeds, at least approximately 5 or 10 milligrams of bacteria per ounce (avoirdupois) of carrier should be employed, and no more than approximately 300 milligrams of bacteria per ounce of carrier. If desired, of course, even larger amounts such as 400 milligrams per ounce of carrier may be used. This is intended to illustrate the broadest range relationship between the bacteria and carrier hereof; and the figures are particularly applicable for a carrier of the density and particulate characteristics of kaolin, although they are believed to have broad general applicability. The ratio selected for a specific inoculant batch will vary depending upon factors such as the density of the carrier (lower density carriers usually being paired with relatively greater weights of bacteria), the particular type of legume seed for which the inoculant mixture is to be employed in inoculation (smaller seeds usually being inoculated with a mixture containing a higher proportion of bacteria), etc. Preferably at least about 20 milligrams of dormant dry bacteria from which water has been sublimed are blended with an ounce of carrier in practicing the invention, with the upper quantity of bacteria being preferably no more than about 200 milligrams of bacteria per ounce of carrier. (Quantities of bacteria in our composition are given in weight measurements, without discussion of bacterial count, simply because known conventional methods and teachings for counting (plate counts) bacteria are unsuitable to employ for "counting" dormant bacteria. No fully reliable method for "counting" dormant bacteria is known.)

A further component of a composite inoculant powder according to the invention may be a trace element added to stimulate healthy plant growth and therefore provide for improved symbiotic nitrogen fixation. Trace elements such as boron, molybdenum, iron, etc., may be added in the form of fines or small particles of salts or complexes such as, for example, sodium molybdate, borax, iron chelate, etc. Where desired, a trace element complex may be selected to perform the dual function of carrier as well as improve plant growth, although in general such an expedient will be avoided for economy reasons. Usually trace elements will account for only up to about 10% or so of the weight of an inoculant powder; and at least not exceed about 10% of the weight of dormant bacteria therein.

Additionally, if desired, our inoculant composition may contain small amounts of other ingredients, such as, for example, fungicides not harmful nor inhibitory to the particular bacteria of the composition. This concept is well understood in the art of inoculation using moisture-contaning non-dormant bacteria. However, since our inoculant composition is applied dry, no significant fungicidal problem has been encountered, although the problem sometimes assumes serious proportions when using moisture-laden inoculants. Nevertheless, fungicidal preparations (e.g., tetramethylthiuramdisulfide) may be added as a dry material to our dry composition up to about a hundred or two hundred times or so of the weight of the bacteria.

In cases where the mixture of carrier and dormant bacteria is to be stored for several years, or even where the mixture is to be shipped across the country for pre-inoculation use at a seed warehouse, the next step after blending is to package the material in a moisture-impermeable container. A suitable illustrative packaging material is an essentially moisture-impermeable flexible film such as a laminate consisting of cellophane coated with a priming film such as Saran (a polyvinylidene chloride material), and further coated with a heat-seal film of polyethylene. The film of material is folded about a mass of the inoculant powder with the polyethylene coating of the film placed in juxtaposition along edges to form a pouch, following which a heating instrument is brought into contact with the meeting edges to fuse the polyethylene coating along the edges and form a seal. Many other flexible film materials may be suitable to use; and indeed, polyethylene films alone may be used. Enclosures or envelopes may be formed by using fastening means other than heat sealing. It is also desirable to enclose film packages within a more durable shipping container such as a drum or carton of reinforced paper.

Legume seeds are treated with the substantially moisture-free inoculant powder of the invention by tumbling a quantity of the inoculant powder with the seeds in the absence of added water. It is important that dry mixing, without added water, be accomplished in all cases where a pre-inoculated seed capable of lengthy storage is desired. As a general rule, soy bean seeds, for example, are mixed with at least about one or two ounces of inoculant powder per bushel of soy bean seeds, whereas smaller legume seeds such as alfalfa or clover or trefoil, are mixed with at least about 2 or possibly 4 ounces of inoculant powder per bushel. The quantity of bacteria in a particular inoculant powder formula, of course, will govern to some extent the quantity of inoculant powder to be mixed with a bushel of seed. Thus, an inoculant powder containing a relatively high quantity of bacteria per ounce of carrier (e.g., about 200 or 300 milligrams of bacteria per ounce of kaolin carrier) is suitably mixed in the amount of about one ounce (or even possibly as little as one-half ounce) of inoculant powder per bushel of legume seeds whereas inoculant powders containing relatively low quantities of bacteria per ounce of carrier (e.g., 10 or possibly 20 milligrams bacteria per ounce of carrier) may be employed in amounts on the order of 5 ounces or more per bushel of seed. The essential requirement is that at least about 20 milligrams (preferably at least 50 milligrams) of dormant bacteria per bushel of seed are used for improved symbiotic relationships during growth, and no more than about 600 milligrams (or possibly 1,000 milligrams) of bacteria per bushel of seed are necessary or particularly desirable for required improved symbiotic relationships during growth.

In blending the inoculant powder hereof with legume seeds, a dust coating of the inoculant powder over the surface or skin-coat of the seed is formed. Despite the fact that storable legume seeds generally contain approximately 8–12% moisture (which is rather tightly held within the seeds), and even though the dormant bacteria of the inoculant hereof is preferably stored in a moisture-impermeable wrapper or container, seeds treated as described have remained satisfactorily inoculated, as demonstrated by planting at a later date, even though stored under ordinary temperature and humidity conditions as encountered in most standard seed warehouses employing sound storage practices for seeds. For example, in growth tests of pre-inoculated alfalfa seeds (pre-inoculated with dormant R. meliloti and kaolin mix), conducted well after six months of storage of the pre-inoculated seeds under ordinary atmospheric conditions characteristic of a seed warehouse, effective inoculation was evidenced by extensive nodule formation on the roots of the alfalfa plants, whereas nodule formation on the roots of alfalfa plants grown from seeds not inoculated was lacking or so sparse as to be insignificant. These results indicate that the dormant bacteria remained alive during such storage and were revitalized to full life functions at planting as described.

Quite dramatic has been the experience with birdsfoot trefoil seeds inoculated according to this invention with sufficient inoculant composition (a mixture of about 80–110 milligrams of dormant Rhizobium bacteria specific for trefoil per ounce of kaolin) to provide about 250–300 milligrams of the dormant bacteria per bushel of seeds. It is well recognized that, if trefoil is grown successfully, effective inoculation has been accomplished; and just such results has been achieved in actual field planting tests (alongside non-inoculated and unsuccessfully grown planted trefoil seeds) conducted after storage of the inoculated trefoil seeds under warehouse conditions for varying periods up to about three months. This is particularly significant, since some green-house grow out tests for these inoculated trefoil seeds gave unreliable results; yet in actual field practice, excellent results were obtained. Similarly, practical field planting of alfalfa and clover inoculated with our composition sufficiently to provide 250–300 milligrams of the dormant bacteria (per bushel) needed for nodule formation (as well as soybeans inoculated with 150–200 milligrams per bushel), and stored under warehouse conditions for varying periods up to about six months, have on planting, in actual field conditions, exhibited effective nodule formation showing that effective inoculation was accomplished.

Insofar as is known, no one has heretofore been able to provide the art with any satisfactory bacterial inoculant for legumes permitting of pre-inoculation of legume seeds and storage of the pre-inoculated seeds for any length of time over a month or so up to six months. Yet the instant invention provides the art with such improved pre-inoculated legume seeds capable of storage under proper seed warehouse conditions for at least several months up to a year and even, under carefully controlled conditions of very low moisture and temperature, indefinitely longer. Our preinoculation does not in any way adversely affect the germination of the seed, and has the advantage of presenting the market with a product for use in gaining symbiotic growth relationships on planting even after surprisingly lengthy storage for the inoculated product. Significantly, the increase of the normal moisture content of seeds by only about 3% during storage (e.g., an increase up to about 15%) is sufficient to cause germination to drop off; and such an increase of the moisture content has been generally accomplished when using prior art moist inoculants for treating legume seeds, but is completely avoided by the technique of the instant invention.

This specification is to be construed in its broadest aspect and as an illustration of the essential features of the invention, which is further defined and set forth in the claims appended hereto.

That which is claimed is:

1. A legume inoculant powder adapted to be stored for lengthy periods and yet remain effective as an inoculant for legumes, comprising an intimately blended mixture of a substantially moisture-free finely-divided mass of dormant bacteria of the genus Rhizobium, said dormant bacteria being of the type formed by sublimation of frozen water therefrom and the mass thereof being such that it contains no more water than up to about 5% by weight, a nutrient selected from the group consisting of mono-saccharides and di-saccharides, and finely-divided substantially moisture-free non-hygroscopic non-toxic chemically-inert carrier particles smaller than about 40 microns to which said dormant bacteria cling, the amount of said bacteria per avoirdupois ounce of said carrier particles being between 5 and 400 milligrams.

2. As a new article of commerce: a substantially moisture-impermeable enclosure of flexible film material within which a legume inoculant powder is protectively packaged in substantially moisture-free condition and against moisture contamination during storage, said powder comprising an intimately blended mixture of a substantially moisture-free finely-divided mass of dormant Rhizobium bacteria of the type formed by subliming frozen water therefrom, said mass of dormant bacteria being such that it contains no more water than up to about 5% by weight, a saccharide nutrient material, and finely-divided substantially moisture-free non-hygroscopic non-toxic chemically-inert carrier particles smaller than 40 microns to which said dormant bacteria cling, the amount of said bacteria per avoirdupois ounce of said carrier particles being between 5 and 400 milligrams.

3. The process for providing pre-inoculated legume seeds adapted to be stored and shipped as articles of commerce, comprising the steps of freezing and subliming water from a culture of Rhizobium bacteria, intimately blending said bacteria in finely-divided condition with finely-divided substantially moisture-free non-hygroscopic non-toxic irregularly-shaped carrier powder particles to which said bacteria cling, and mixing the blend of said bacteria and carrier powder particles with legume seeds in the absence of added water to effect a clinging dust coating of the blend on said legume seeds, with sufficient of said blend being employed to provide at least 20 milligrams of said dormant bacteria per bushel of said seeds, the particular legume seed and Rhizobium bacteria being selected for their cross-inoculation properties.

4. The process for providing pre-inoculated legume seeds adapted to be stored and shipped as articles of commerce, comprising mixing seeds from the family Leguminosae with a blended intimate combination of a finely-divided mass of dormant Rhizobium bacteria of the type formed by sublimation of frozen water therefrom and finely-divided substantially moisture-free non-hygroscopic non-toxic irregularly-shaped carrier powder particles to which said bacteria cling, the mixing being conducted in the absence of added water and with sufficient of said blended combination to provide a clinging dust coating on the seeds containing at least 20 milligrams of said dormant bacteria per bushel of said seeds, said bacteria and said seeds being selected for their cross-inoculation properties.

5. As a new product of commerce: pre-inoculated alfalfa legume seeds characterized by having a clinging dust coating on their outer surface, the dust comprising an intimately blended mixture of a finely-divided mass of dormant *Rhizobium meliloti* bacteria of the type formed by sublimation of frozen water therefrom, said mass of dormant bacteria being such that it contains no more water than up to about 5% by weight, and finely-divided non-hygroscopic non-toxic chemically-inert irregularly-shaped carrier powder particles to which said bacteria cling, the quantity of said dormant bacteria ranging between 5 and 400 milligrams per avoirdupois ounce of said powder particles, said dust coating containing at least 20 milligrams of said dormant bacteria per bushel of said seeds.

6. As a new product of commerce: pre-inoculated legume seeds characterized by having their outer surface coated with a clinging dust comprising an intimately blended mixture of a finely-divided mass of dormant Rhizobium bacteria of the type formed by sublimation of frozen water therefrom, said mass of dormant bacteria being such that it contains no more water than up to 5% by weight, a saccharide nutrient material, and non-hygroscopic non-toxic irregularly-shaped chemically-inert carrier powder particles smaller than about 40 microns to which said bacteria cling, the quantity of said dormant bacteria ranging between 5 and 400 milligrams per avoirdupois ounce of said powder particles, and sufficient of said dust coating being present on said seeds to provide at least about 20 milligrams of said dormant bacteria per bushel of seeds, said bacteria and said seeds being selected for their cross-inoculation properties.

7. As a new product of commerce: pre-inoculated legume seeds characterized by having their outer surface coated with a dust comprising an intimate mixture of a finely-divided mass of dormant Rhizobium bacteria prepared by freezing a water-containing culture of said bacteria and substantially removing frozen water therefrom by evaporation under vacuum conditions, and finely-divided kaolin powder particles smaller than about 40 microns, the quantity of said dormant bacteria ranging between about 10 and 200 milligrams per avoirdupois ounce of said powder particles, and sufficient of said dust coating being present on said seeds to provide at least about 20 milligrams of said dormant bacteria per bushel of seeds, said seeds and bacteria being selected for their cross-inoculation properties.

8. The process of providing pre-inoculated legume seeds adapted to be stored and shipped as articles of commerce, comprising the steps of freezing a water-containing culture of Rhizobium bacteria, substantially removing frozen water from said bacteria by evaporation under vacuum conditions, blending said substantially moisture-free Rhizobium bacteria with finely-divided kaolin powder particles, sufficient of said bacteria being blended with said powder particles to provide a mixture having between about 10 and 200 milligrams of said bacteria per ounce of said powder particles, and mixing sufficient of the resulting blend with legume seeds in the absence of added water to coat said seeds with dust containing at least about 20 milligrams of bacteria per bushel of seeds, said seeds and bacteria being selected for their cross-inoculation properties.

9. The process of providing pre-inoculated legume seeds adapted to be stored and shipped as articles of commerce, comprising mixing legume seeds with a dusty blend of dormant Rhizobium bacteria of the type formed by sublimation of frozen water therefrom, said dormant bacteria being such that it contains no more water than up to about 5% by weight thereof, and finely-divided kaolin powder particles smaller than about 40 microns, said blend containing between about 5 and 400 milligrams of said bacteria per avoirdupois ounce of said powder particles, the mixing being conducted in the absence of added water to provide a dust coating of said blend on the seeds, with sufficient of said blend being coated on said seeds to provide at least about 20 milligrams of said dormant bacteria per bushel of seeds, said seeds and bacteria being selected for their cross-inoculation properties.

10. A legume inoculant powder adapted to be stored for lengthy periods and yet remain effective as an inoculant for legumes, said powder comprising a substantially moisture-free finely-divided mass of dormant Rhizobium bacteria of the type formed by sublimation of frozen water therefrom, said mass of dormant bacteria being such that it contains no more water than up to about 5% by weight, and a saccharide nutrient material in blended intimate combination with finely divided kaolin powder particles smaller than about 40 microns, the quantity of said dormant bacteria in the mixture ranging between about 5 and 400 milligrams per avoirdupois ounce of said powder particles.

11. As a new article of commerce: a container having a substantially moisture-impermeable film material forming an enclosure within which a substantially moisture-free legume inoculant powder is protectively packaged against moisture contamination during storage, said powder comprising an intimate blend of a substantially moisture-free finely-divided mass of dormant Rhizobium bacteria of the type formed by subliming frozen water therefrom, said mass of dormant bacteria being such that it contains no more water than up to about 5% by weight, and kaolin powder carrier particles smaller than about 40 microns, the quantity of said dormant bacteria in said blend being between 5 and 400 milligrams per avoirdupois ounce of said powder particles.

12. The process for providing pre-inoculated legume seeds adapted to be stored and shipped as articles of commerce, comprising mixing seeds from the family Leguminosae with a blended intimate combination of a finely-divided mass of dormant Rhizobium bacteria of the type formed by sublimation of frozen water therefrom, said mass of dormant bacteria being such that it contains no more water than up to about 5% by weight, and finely-divided substantially moisture-free non-hygroscopic non-toxic chemically-inert irregularly-shaped carrier powder particles to which said bacteria cling, the mixing being conducted in the absence of added water and with sufficient of said blended combination to provide a clinging dust coating on the seeds containing at least 20 milligrams of said dormant bacteria per bushel of said seeds, said bacteria and said seeds being selected for their cross-inoculation properties.

References Cited by the Examiner

UNITED STATES PATENTS

| | | | |
|---|---|---|---|
| 2,200,532 | 5/40 | Bond. | |
| 2,954,643 | 10/60 | Porter | 47—58 |
| 3,054,219 | 9/62 | Porter | 47—1 |

FOREIGN PATENTS

| | | |
|---|---|---|
| 521,850 | 8/53 | Belgium. |
| 554,754 | 2/57 | Belgium. |
| 1,180,000 | 12/58 | France. |
| 59,489 | 1957 | India. |

OTHER REFERENCES

Appleman, M. D., and Sears, O. H.—The Possibility of Using Lyophiled Cultures as Commercial Legume Inoculants; in Soil Science Society of America Proceedings, 1944, vol. 9, pages 98–100, published 1945 by said Society at Morgantown, W. Va.

Hackh's Chemical Dictionary, third edition, Phila., Blakiston, 1944, pages 292 and 359. QD5.H3 (1944).

Wilcox, E. V.—Modern Farmers' Cyclopedia of Agriculture. N.Y., Orange Judd, 1952, page 482, S 501, W57 (1952).

T. GRAHAM CRAVER, *Primary Examiner.*

A. JOSEPH GOLDBERG, *Examiner.*